United States Patent [19]

Matui

[11] Patent Number: 5,231,639
[45] Date of Patent: Jul. 27, 1993

[54] FRAME STEP-OUT DETECTING METHOD FOR DATA TRANSMISSION AND SYSTEM THEREOF

[75] Inventor: Hitoshi Matui, Tokyo, Japan
[73] Assignee: NEC Corporation, Tokyo, Japan
[21] Appl. No.: 543,512
[22] Filed: Jun. 26, 1990

[30] Foreign Application Priority Data

Jun. 26, 1989 [JP] Japan .................... 1-164221

[51] Int. Cl.$^5$ .................... G06F 11/10
[52] U.S. Cl. .................... 371/43; 371/44; 371/45; 371/46; 375/17
[58] Field of Search .................... 371/43, 44, 45, 46; 375/17, 42, 53, 54, 56, 57, 83, 111, 114, 116, 118

[56] References Cited

U.S. PATENT DOCUMENTS

| | | | |
|---|---|---|---|
| 4,583,236 | 4/1986 | Kromer | 371/46 X |
| 4,837,766 | 6/1989 | Yoshida | 371/43 X |
| 4,993,046 | 2/1991 | Saito | 371/43 X |
| 5,029,185 | 7/1991 | Wei | 371/43 X |
| 5,050,191 | 9/1991 | No | 371/43 X |
| 5,054,036 | 10/1991 | Brownlie | 371/43 X |

Primary Examiner—Robert W. Beausoliel, Jr.
Assistant Examiner—Ly V. Hua
Attorney, Agent, or Firm—Sughrue, Mion, Zinn, Macpeak & Seas

[57] ABSTRACT

A frame step-out detection method and apparatus capable of detecting any frame step-out without having to insert a frame sync pulse or any other additional data, especially when using data mapping, which is transparent to a 90°×n phase revolution of the input data. During operation input data is encoded and supplied alternately to a first or second mapping table. Each mapping table is transparent to a 90°×n (n is an integer) phase revolution of the data mapped through that table, but not transparent to a 90°×n phase revolution of data from the other table. The mapped data is modulated and transmitted to a demodulator. The demodulator generates a signal to select a first or second determination table, which corresponds with the selected first or second mapping table. The demodulated data is determined from the determination table. If an error occurs during data transmission, the wrong determination table will be selected (i.e. the determination table which does not correspond to the mapping table used), which will cause errors in the determination data. These errors are easily detected thereafter.

5 Claims, 8 Drawing Sheets

| | Y0n, Y1n, Y2n |
|---|---|
| a | 0 0 0 |
| b | 0 1 0 |
| c | 0 0 1 |
| d | 0 1 1 |
| e | 1 1 0 |
| f | 1 0 1 |
| g | 1 1 1 |
| h | 1 0 0 |

FRAME STEP-OUT DETECTING METHOD FOR DATA TRANSMISSION AND SYSTEM THEREOF

BACKGROUND OF THE INVENTION

The present invention relates to a method for detecting frame step-out in data transmission, and more particularly to the detection of frame step-out in data transmission by an encoding method to add redundant bits, such as convolutional encoding.

Frame synchronization is carried out in bit-multiplexed transmission of a plurality of low speed data signals, so that low speed data signals, obtained by separation on the receiving side, can duly correspond to those on the sending side. According to the prior art, frame synchronization needs no special means in some cases while it does require special means in other cases. In data transmission using a voice-band modem, for instance, no special means for frame synchronization, i.e. for step-out detection, is needed if n channels of the low speed data signals having 2400 bps (n is a natural number not greater than 6) are multiplexed at a multiplexing speed of 2400 Hz into a transmission signal having 14.4 Kbps, which is then modulated at a modulating speed of 2,400 bauds. More definitely, when the modulating speed is equal to the multiplexing speed, the number of the low speed data signals demodulated at the receiving side becomes equal to the number of the low speed data signals multiplexed at the transmitting side. Thus, when the demodulation clock is recovered at the receiving side by means of the PLL, the synchronization between the transmitting and receiving sides is established without specific means to correctly separate the transmission signal into the original low speed data signals. Meanwhile, where the bit rate after multiplexing is over 14.4 Kbps, for instance 19.2 Kbps, it is customary that redundant encoding is carried out at the transmitting side to improve the reliability of data transmission. In this situation, the number of multiplexed data channels is different from the number of transmitted data channels. For example, a 7-bit data signal from the 8 channels is redundant encoded to an 8-bit signal to which a data signal point is assigned in the modulator. It follows that $7 \times 8 = 56$ bits are necessary for the first channel to appear at the initial state. Therefore, the data transmission using redundant encoding requires the frame synchronization to indicate the boundary of 56 bits in the transmission signal. This frame synchronization is performed, according to the prior art, with a frame sync pulse or the like inserted into transmission data. Since a frame sync pulse is not an information datum to be transmitted, this results in wasting part of the transmission capacity which corresponds to the frame sync pulse. Meanwhile, a method to detect step-out using no such additional datum is disclosed, for instance in the U.S. Pat. No. 4,837,766. According to this U.S. patent, there are used a convolutional encoder and a data mapping table, which are not transparent to the phase revolution of $90° \times n$ (n is an integer). In this specification, the term "transparent to a $90° \times n$ phase revolution" with regard to a mapping table means that no decoding error occurs even if the received data suffers from a $90° \times n$ phase revolution on a transmission line. Therefore, if the data having a phase lag of $90° \times n$ is received its convoluted state is disordered upon decoding by a Viterbi decoder. As a result, a frame step-out is detected by the detection of the decoding error that arises whenever a frame step-out occurs. To be more specific, as illustrated in FIG. 3 of the patent, mapped data after trellis coding are successively subjected to a $90° \times n$ phase revolution and transmitted, while decoding is performed on the receiving side after subjecting the received data to a similar phase revolution. If frame synchronization is achieved in the transmission and reception of mapped data, the data will be properly decoded. Any frame step-out that may have arisen can be detected by an error in decoded data. The frame step-out detection described in U.S. Pat. No. 4,837,766, however, is applicable only to such data mapping as would invite a data error due to a $90° \times n$ phase revolution, but not to data mapping which is transparent to a $90° \times n$ phase revolution shown in FIG. 3/V.32 of the CCITT Recommendation V.32, which will be referred to in further detail below.

Since data mapping which is transparent to a $90° \times n$ phase revolution is less susceptible to decoding errors due to phase jumps or the like, it is desirable, in order to improve the reliability of data transmission as well, that such data mapping can be used.

SUMMARY OF THE INVENTION

An object of the present invention is to provide a frame step-out detection method capable of detecting any frame step-out without having to insert a frame sync pulse or any other additional datum even when using data mapping which is transparent to a $90° \times n$ phase revolution.

According to the invention, there is provided a frame step-out detection method comprising a step to perform predetermined redundant encoding on input data to supply it as encoded data. In response to a first selection signal having a predetermined period, first and second mapping tables are alternately selected. Each of the mapping tables is transparent to a $90° \times n$ (n is an integer) phase revolution, but not transparent to a $90° \times n$ phase revolution of the other. The encoded data is converted to mapped data in accordance with the selected mapping table. The mapped data is modulated to produce modulated data. A second selection signal, corresponding to the first selection signal, is generated from the modulated data while the modulated data is demodulated to produce demodulated data. First and second determination tables, corresponding to the first and second mapping tables, are alternately selected in response to the second selection signal. The demodulated data is determined on the basis of the selected determination table and outputted as determined data. The determined data is decoded to produce received data. A frame step-out detection signal is outputted in the event of any error arising in the decoding.

BRIEF DESCRIPTION OF THE DRAWINGS

The above and other objects, features and advantages of the present invention will become more apparent from the following detailed description when taken with the accompanying drawings in which.

DETAILED DESCRIPTION OF THE PREFERRED EMBODIMENTS

Figure 1:
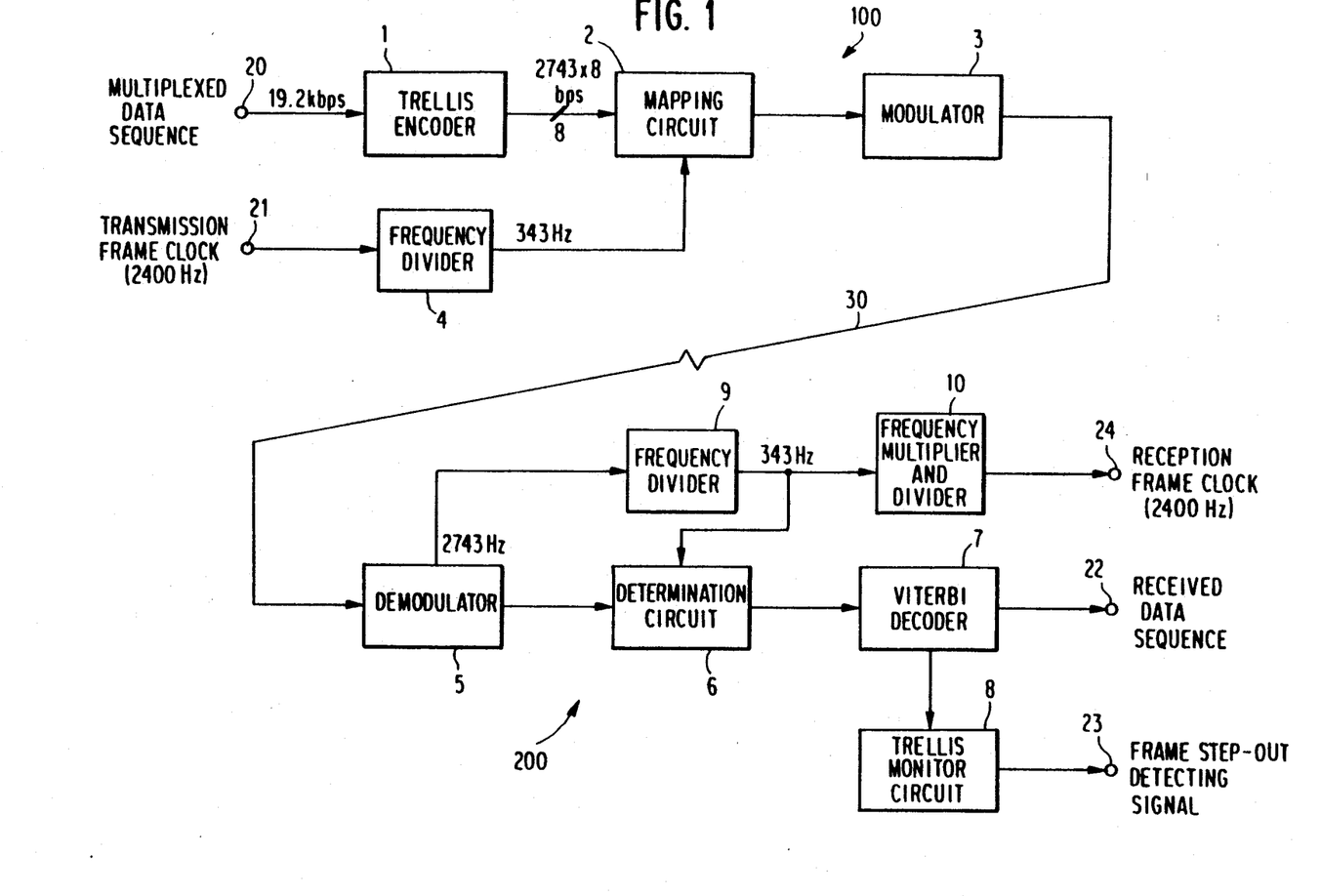
FIG. 1 is a block diagram illustrating an example of data transmission system to which the invention is applied.

FIG. 1 illustrates an example of data transmission system to which the invention is applied. In FIG. 1, the data transmission system comprises a transmission circuit 100 and a reception circuit 200 connected to the transmission circuit 100 by a communication line 30. The transmission circuit 100 further comprises a trellis encoder 1, a data mapping circuit 2, a modulator 3 and a frequency divider 4, while the reception circuit 200 comprises a demodulator 5, a determination circuit 6, a Viterbi decoder 7, a frame step-out detecting circuit 8, a second frequency divider 9 and a frequency multiplier/divider 10. The data transmission system illustrated in FIG. 1 is supposed to receive one 19.2 Kbps high speed data signal (high speed channel) resulting from the multiplexing of eight 2400 bps low speed data signals (low speed channels) by a time division multiplexing circuit (MUX), which is not shown in the diagram. The trellis encoder 1 is supposed to encode input data bits in units of seven bits each to supply eight-bit encoded data including one redundant bit.

Next will be described the operation of the system shown in FIG. 1. The trellis encoder 1 is supplied with 19.2 kbps serial data via a data input terminal 20. To supply eight bit parallel encoded data from an input of seven bit serial data, the trellis encoder 1 outputs data at a speed of 19200 bps/7≈2743 words/s. The parallel encoded data are supplied to the mapping circuit 2 and converted into mapped data according to a mapping table. This conversion or mapping uses one of two mapping tables provided in the mapping circuit 2, which is selected by a selection signal. Frame step-out detection according to the present invention, as will be described in more detail below, utilizes the relationship between these two mapping tables in the mapping circuit 2. The first frequency divider 4 divides a 2400 Hz frame sync signal received from a clock generating circuit (not shown), by seven and supplies the resultant divided-frequency 343 Hz clock pulse to the mapping circuit 2 as the selection signal. As a result, the switching between the two mapping tables in the mapping circuit 2 is performed in a seven bit cycle for each of the 2400 bps low speed channels or in an eight word cycle. In other words, since the real transmitted data in each word consist of seven bits, the switching takes place after every 56 bits (≈8 words×7) are transmitted, i.e. at seven bit/channel intervals. On the basis of the mapped data supplied from the mapping circuit 2, the modulator 3 performs modulation, such as QAM, at 2743 bauds and sends the modulated data to the transmission path 30.

The demodulator 5 regenerates a 2743 Hz clock pulse. synchronized with modulated data received via the transmission path 30, while demodulating the modulated data therefrom and supplying the demodulated data. The second frequency divider 9 frequency-divides this regenerated clock by eight to generate a 343 Hz determination clock pulse. The determination circuit 6, in response to the determination clock pulse from the second frequency divider 9, switches between the determination tables corresponding to the two mapping tables provided in the mapping circuit 2, to determine the decoded data, and then supplies the determined data as its output. The Viterbi decoder 7 decodes the determined data, and supplies the decoded data via a terminal 22 as 19.2 kbps received data. The trellis monitor circuit 8 monitors the internal state of the Viterbi decoder 7 to detect any decoding error that may arise. The frequency multiplier/divider 10, on the basis of a 343 Hz clock pulse generated by the second frequency divider 9, regenerates a 2400 Hz frame clock pulse, and supplies it via a terminal 24 to a separating circuit (not shown). The separating circuit which is responsive to the regenerated frame clock pulse, performs separation using the leading edge of the reception clock pulse, for instance, as the selection timing for the first output channel. When this transmission system starts operation, the positional relationship is adjusted between the channels selected during multiplexing and the separating circuits at the leading edge of the regenerated frame clock pulse. The positional relationship between the leading edge of the selection signal and transmitted data in the transmitting circuit and that between the leading edge of the determination clock pulse and received data in the receiving circuit are also adjusted when the system starts operation. Accordingly, as long as data transmission normally takes place, there is neither a frame step-out nor continuous decoding errors. If, however, a phase jump or a data omission is caused by trouble on the transmission path, it will affect the phase of the 2743 Hz regenerated clock pulse extracted by the demodulator 5. Consequently, there will arise a lag in the phase of the 343 Hz determination clock pulse obtained by frequency-dividing. As a result, phase lags will also occur between the selection signal and transmitted data, and between the determination clock pulse and received data. The phase lag of the determination clock pulse ultimately affects the regenerated frame clock pulse, which is the output of the frequency multiplier/divider 10, and thereby causes a frame step-out between the input and output channels. The frame step-out is detected in the following manner. As the determination clock pulse is used by the determination circuit 6 for selecting the determination table, a phase lag of this pulse causes the received data to be determined according to the determination table which does not correspond to the mapping table used during data transmission, which causes continuous decoding errors in the Viterbi decoder 7. This decoding error is detected by the trellis monitor circuit 8, which supplies a frame step-out detection signal via a terminal 23.

The conditions of the mapping tables for use in detecting a frame step-out are explained hereafter. According to the present invention, as described above, the mapping is transparent even to a 90°×n phase revolution, and a frame step-out is detected without inserting any additional datum such as a frame sync bit, so that there are two mapping tables used which satisfy the following two conditions.

I. Both mapping tables should be transparent to a 90°×n (n is an integer) phase revolution.

II. Neither mapping table should be transparent to a 90°×n phase revolution of the other.

By alternating the two tables back and forth in sending out data, any frame step-out due to an error on the transmission path or the like can be readily detected. This point will be described in further detail below.

Figure 2A:
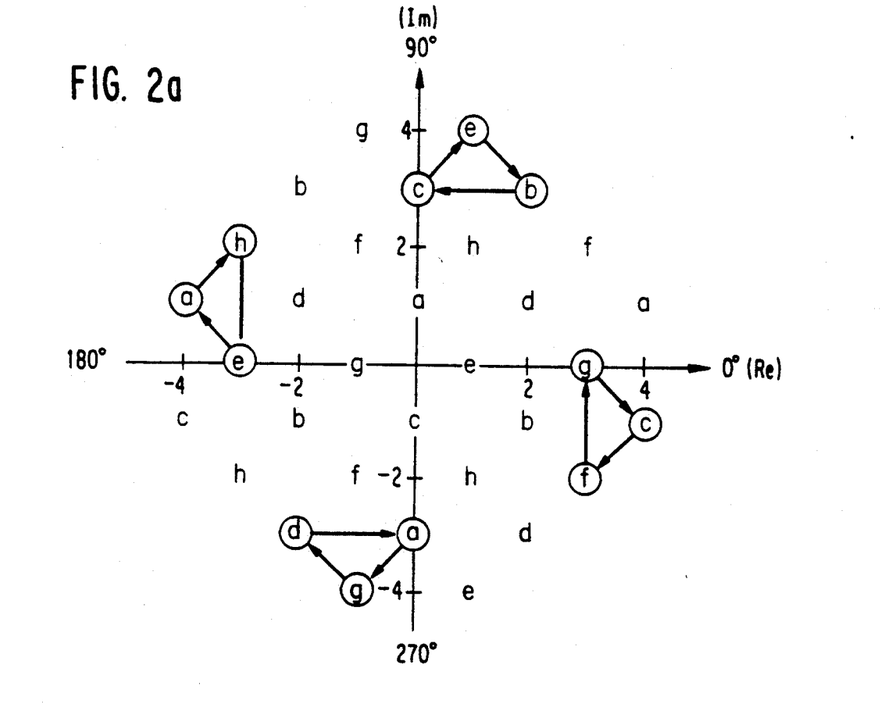
FIGS. 2a to 2c are diagrams showing examples of mapping tables for use in the invention.
Figure 2B:
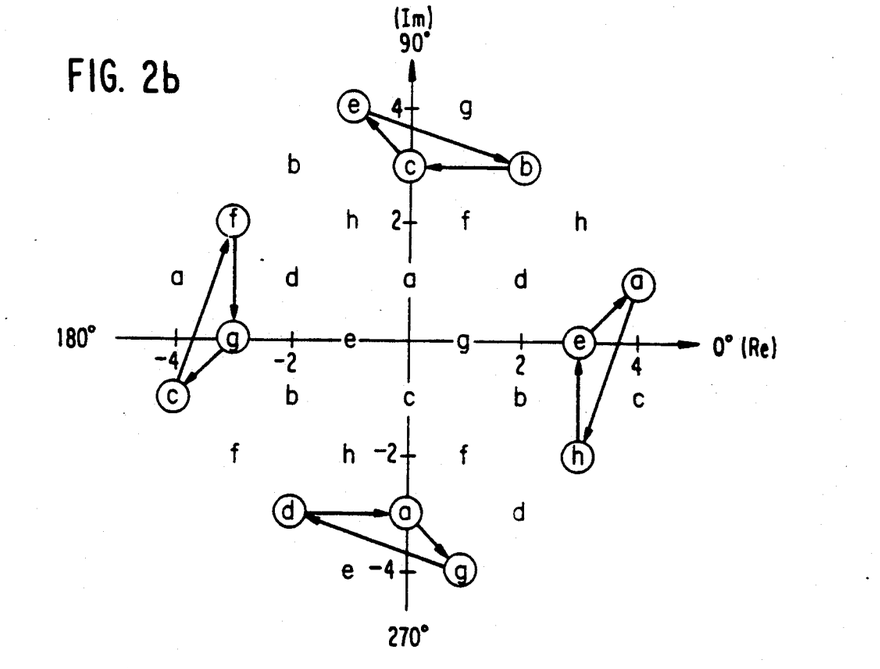

FIGS. 2a and 2b illustrate examples of mapping tables which satisfy the above conditions.

Figure 3:
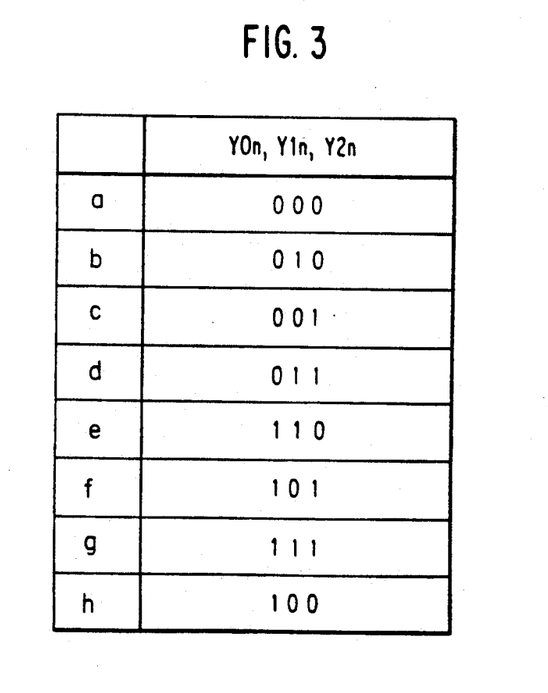
FIG. 3 is a table showing how symbols in FIGS. 2a to 2c correspond to one another.

FIG. 2a shows a mapping table according to CCITT Recommendation V.32. Although a 19.2 kbps transmission system requires the mapping of 256 data points, only 32 data points are mapped in this preferred embodiment for the sake of simplifying the description. In FIG. 2a, each of letters a to h denotes one of the eight groups, into which 32 data points are classified by Ungerboeck's set partitioning method. These letters a to h are so assigned as to match output bits $Y0_n$, $Y1_n$ and $Y2_n$ of the encoder in the manner shown in FIG. 3.

FIG. 2b shows a mapping table obtained by rotating that of FIG. 2a by 180° around an imaginary axis, i.e. by reversing the polarities of the real axis coordinate values at all the data arrangement points. Mapping tables having such a mutual relationship will be hereinafter called mapping tables in a symmetric relationship.

Now will be explained how these two mapping tables satisfy the aforementioned conditions I and II with reference to a trellis transitional diagram shown in FIG. 4.

Figure 4:
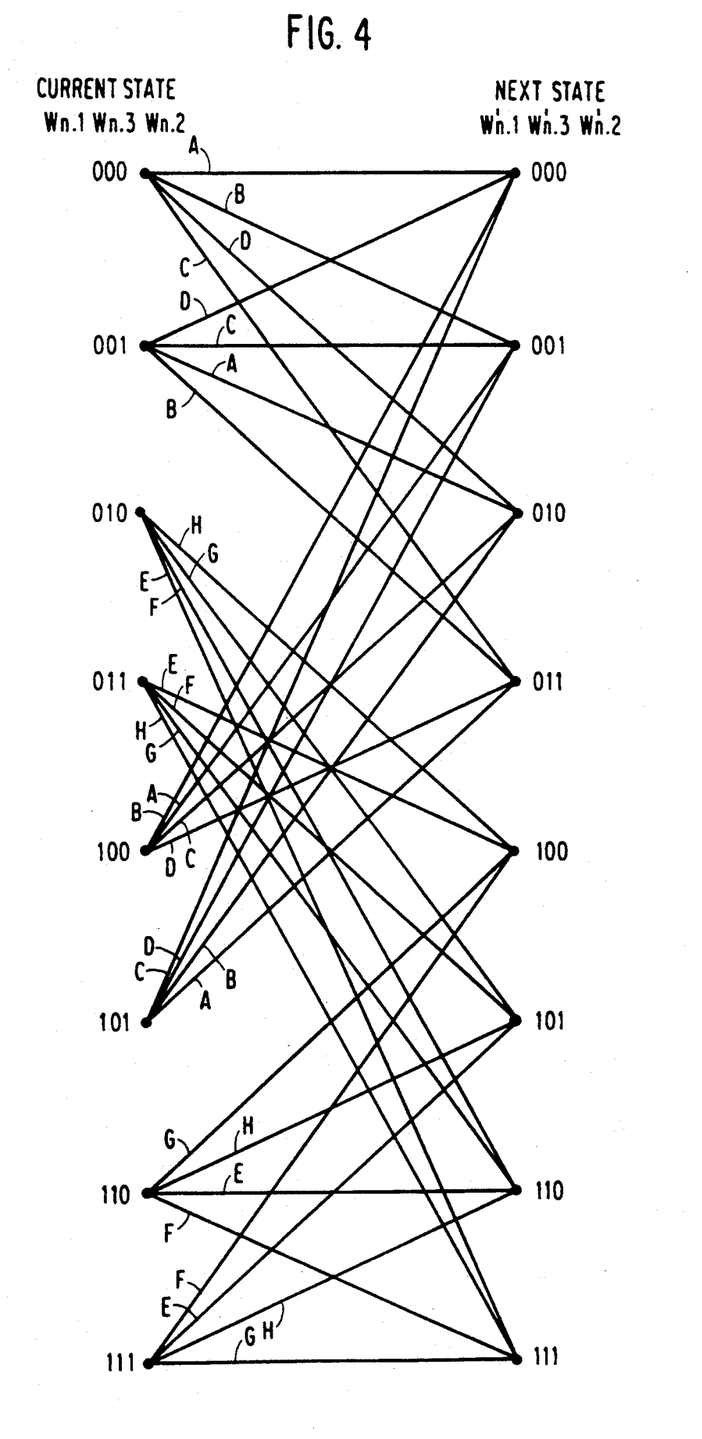
FIG. 4 is a diagram of internal state transition in the convolutional encoder according to the CCITT Recommendation V.32.

FIG. 4 is a trellis transitional diagram concerning the internal state of a convolutional encoder according to the CCITT Recommendation V.32. This diagram illustrates the restrictive conditions binding upon the transition of the output values of three delaying elements used in the convolutional encoder from a current state to the next state. While the three delaying elements can take one of eight different states, there are only four alternative states to which each is allowed transition from its current state as shown in FIG. 4. Letters A to H assigned to the paths connecting each pair of states denote the kinds of the $Y0_n$, $Y1_n$ and $Y2_n$ supplied by the convolutional encoder in response to transition between two ends of each path, and correspond to the letters a to h in FIG. 3. If, for instance, the current state is "000" and "000" is outputted as $Y0_n$, $Y1_n$ and $Y2_n$, the next state to which transition will take place will be "000", or if "010" is outputted, the next state will be "001". Transition from the state of "000" to that of "100", "101", "110" or "111" is impossible.

It is now supposed that the mapping table of FIG. 2a is used for the data transmission of e→b→c. The data transitions involved, represented by state "011"→path E→state "100", state "100"→path B →state"000", and state "000"→path C→state "011" (this transition is hereinafter abbreviated to 011→E→100→B→000→C→011, and others are similarly abbreviated) in FIG. 4, are all allowable. Then, with reference to the mapping table of FIG. 2a, the transition of a→h→e (101→A→011→H→111→E→101), which results from a 90° revolution of the transition of e→b→c, the transition of g→d→a (010→G→101→D→001→A→010) which results from a 180° revolution of e→b→c, and the transition of c→f→g (100→C→010→F→110→G→100), results from a 270° revolution of same, are all present in the trellis transition diagram of FIG. 4. Accordingly the mapping table of FIG. 2a is transparent to a 90°×n phase revolution. Meanwhile, similarly considering the transition of e→b→c with reference to the mapping table of FIG. 2b as well, there are the transitions of c→f→g, g→d→a and a→h→e by 90°, 180° and 270° phase revolutions, respectively. Moreover, since all of these transitions are present in the trellis transition diagram of FIG. 4, the mapping table of FIG. 2b also is transparent to a 90°×n phase revolution. It is thus seen that condition I is satisfied.

Figure 2C:
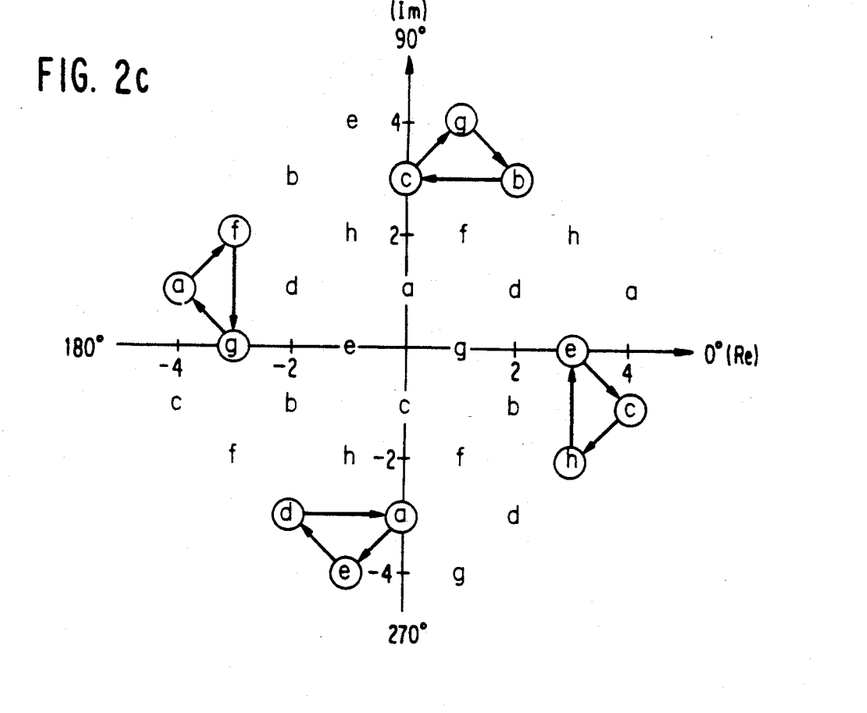

Condition II will now be discussed, assuming data transmission of e→b→c→e→ . . . from transmission circuit 100 is repeated using the mapping table of FIG. 2a. If these data are received by the reception circuit using the determination table corresponding to the mapping table of FIG. 2b, the determined data will correspond to transition g→b→c→g→ . . . provided there is no phase revolution as shown in FIG. 2c. As this state transition is absent in the trellis transition diagram of FIG. 4, a decoding error will result. Similarly, if there are 90°, 180° and 270° phase revolutions, the state transitions of a→f→g→a→ . . . , e→d→a→e→ . . . and c→h→e→c→ . . . are determined, none of which is present in the trellis transition diagram, thus causing continuous decoding errors. It can be readily understood by those skilled in the art that, even if the relationship between the mapping table on the transmitting side and the determination table on the receiving side is reversed, the result will be determined as state transitions absent in the trellis transition diagram. Thus, none of the mapping tables 2a and 2b is transparent to a 90°×n phase revolution of the other table, and accordingly condition II is also satisfied.

Figure 6A:
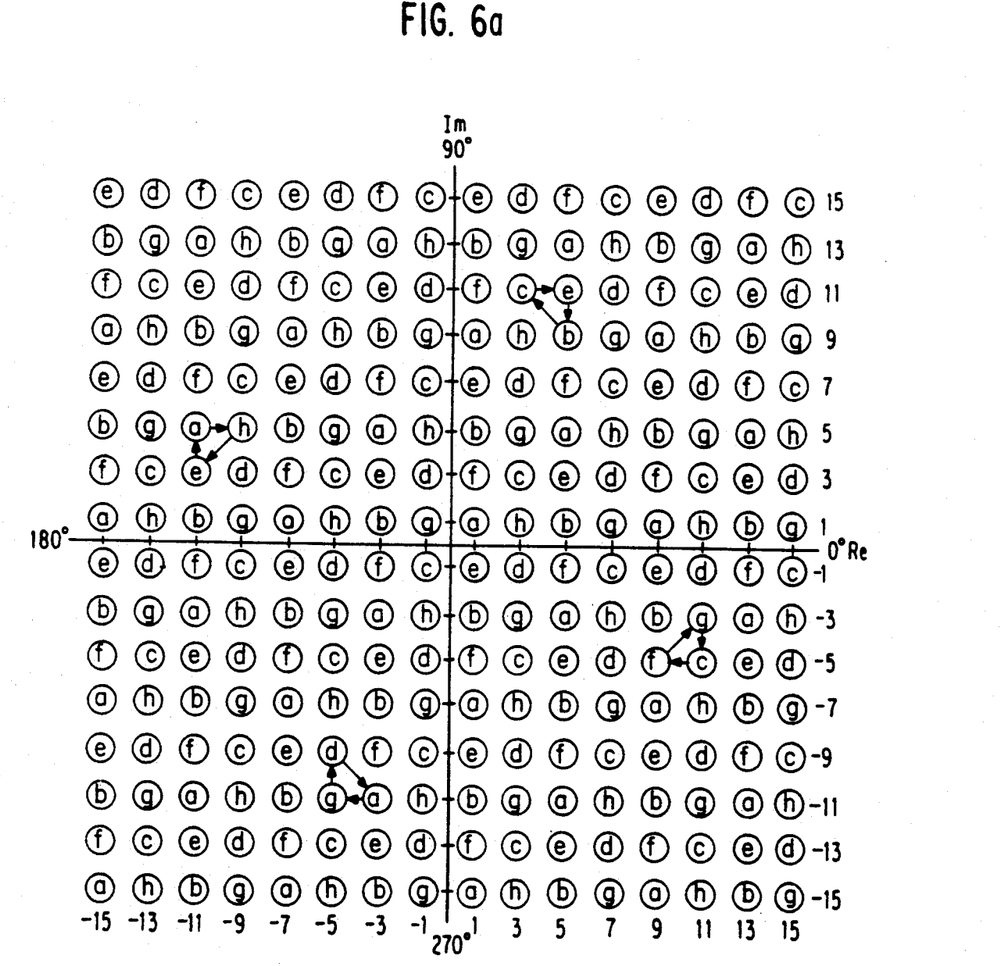
FIGS. 6a to 6c are diagrams showing examples of mapping tables for use in the 19.2 Kbps transmission system.
Figure 6B:
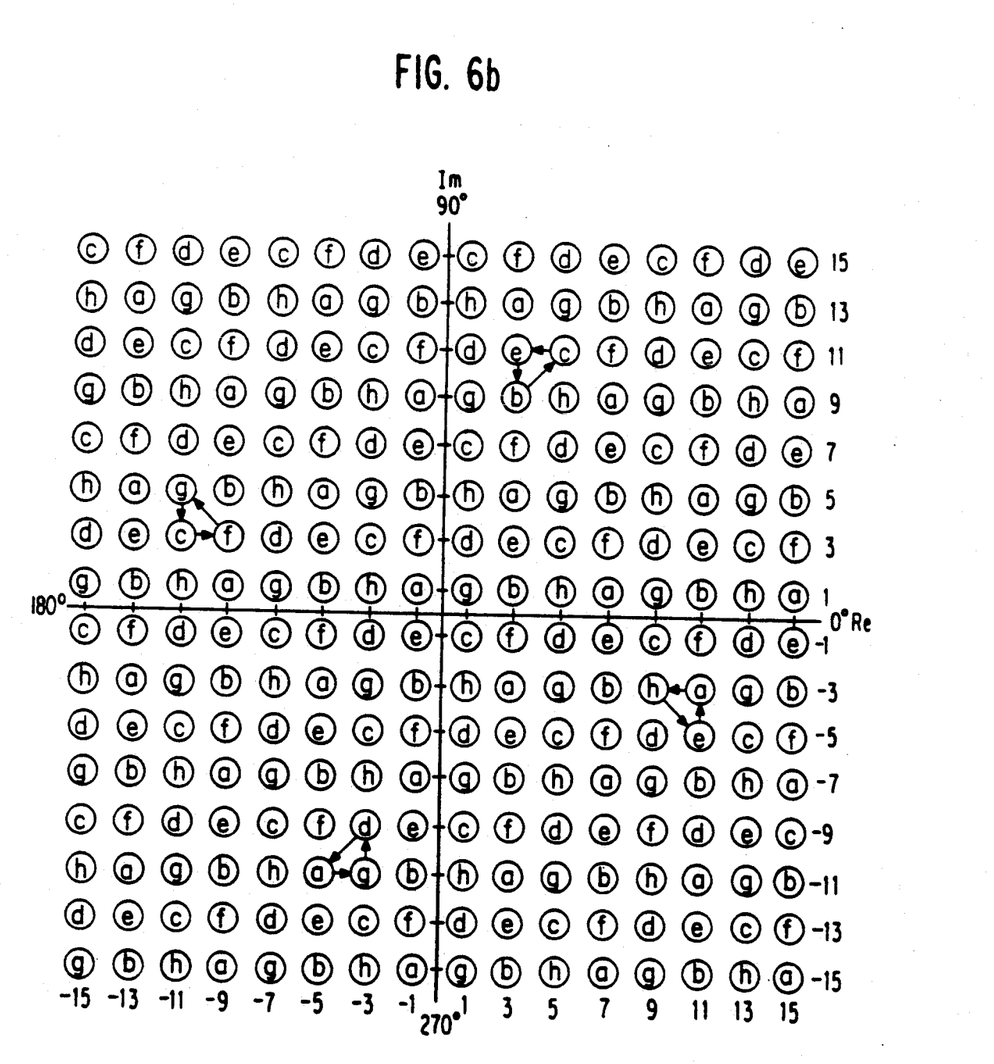

FIGS. 6a and 6b illustrates example of mapping tables which are applicable for the 19.2 kbps transmission system and satisfy the conditions I and II described above. Each of the mapping tables has 256 data points, i.e. 16×16, and the data points are mapped squarely. The mapping tables shown in FIGS. 6a and 6b are obtained by a 45° phase revolution and data point increasing of the mapping tables shown in FIGS. 2a and 2b, respectively. Thus, the trellis transitional diagram of FIG. 4 is usable for the mapping tables of FIGS. 6a and 6b. The mapping table of FIG. 6a is also transparent to a 90°×n phase revolution as well as the table of FIG. 2a. The same example as used for the table of FIG. 2a is considered. The data transmission of e→b→c using the table of FIG. 6a is determined as of a→h→e, g→d→a and a→h→e by the mapping tables of 90°, 180°, 270° phase revolutions, respectively. As all of these data transitions are present in the trellis diagram of FIG. 4, the mapping table of FIG. 6a is transparent to a 90°×n phase revolution. Meanwhile, as the mapping table of FIG. 6b corresponds to the table of FIG. 2b and has symmetrical relationship with the table of FIG. 6a, it is easily understood that the table of FIG. 6b is also transparent to a 90°×n phase revolution. Thus, the two tables of FIGS. 6a and 6b satisfy condition I.

Figure 6C:
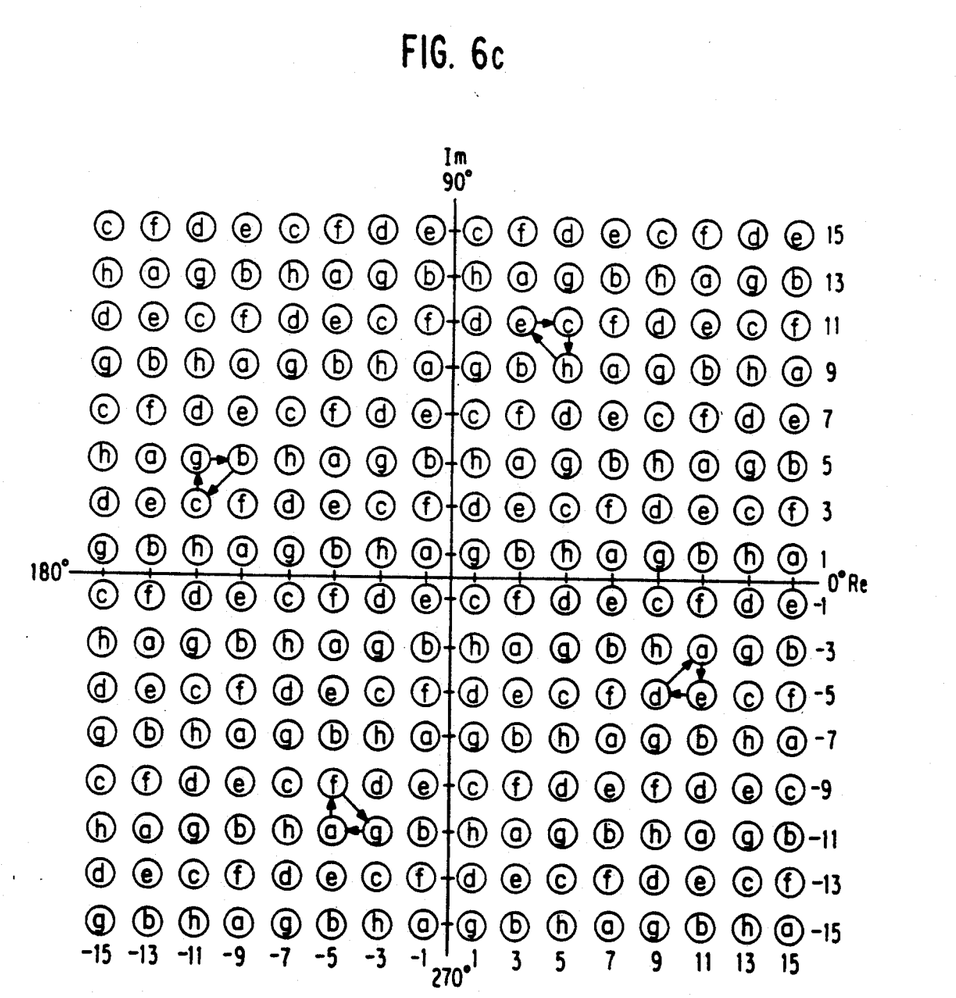

Next, condition II will be considered. FIG. 6c corresponds to FIG. 2c and shows data points which is obtained by determining the transmission data based on the table of FIG. 6a by using the table of FIG. 6b. In FIG. 6c, the transmission data e→b→c using the table of FIG. 6a are tentatively determined as c→h→e, g→b→c, a→f→g and e→d→a by the mapping tables of 0°, 90°, 180° and 270° phase revolution, respectively. As in FIG. 2c, none of these data transitions exists in the trellis transitional diagram of FIG. 4, continuous decoded errors will result. Thus, neither of the mapping tables in FIGS. 6a and 6b is transparent to a 90°×n phase revolution of the other, and accordingly condition II is satisfied.

As hitherto explained, the satisfaction of condition I prevents the occurrence of any continuous decoding errors due to a 90°×n phase revolution if the mapping table and the determination table are properly selected, resulting in improved reliability against a phase jump or the like due to an error on the transmission path. Meanwhile, condition II ensures that, if there arises a frame step-out, the determination table which is different from the mapping table used at the time of transmission will be selected, resulting in continuous decoding errors to make the step-out detectable.

Figure 5A:
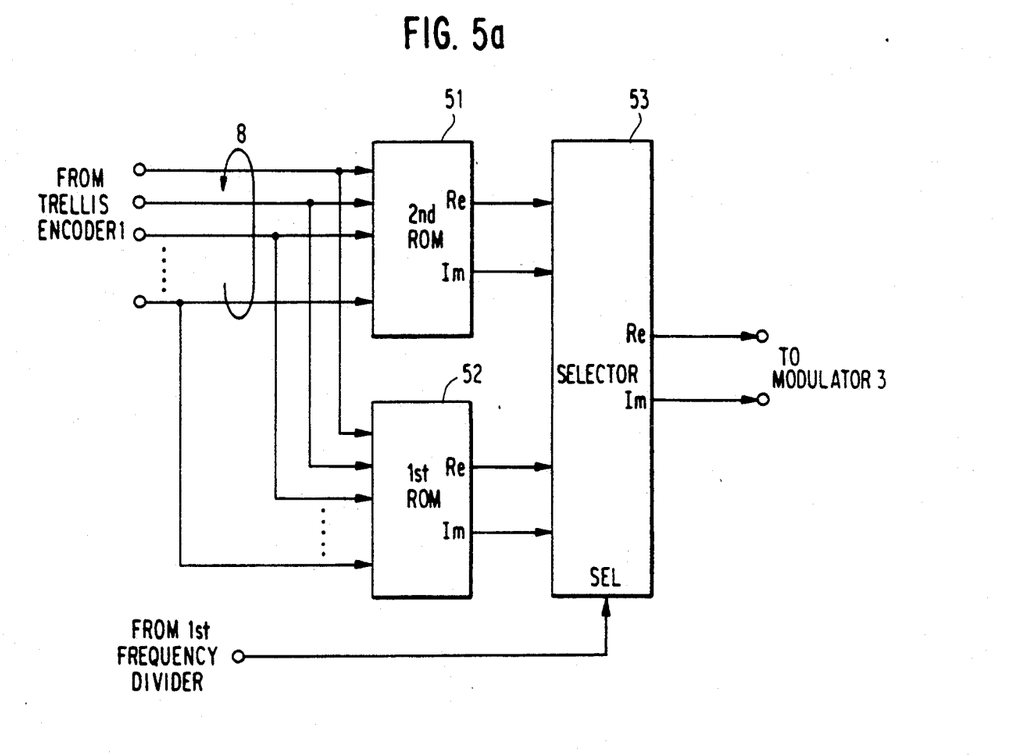
FIGS. 5a and 5b are block diagrams of examples of the mapping circuit in FIG. 1.

A specific example of the mapping circuit 2 is illustrated in FIG. 5a. In FIG. 5a, the mapping circuit 2 comprises first and second ROM's 51 and 52 which store the first and second mapping tables satisfying the conditions I and II, and a selector 53 which receives the outputs of the first and second ROM's 51 and 52 to selectively output one or the other of the mapping tables according to a selection signal from the first frequency divider 4. The first and second ROM's 51 and 52 receive encoded data in an eight bit parallel connection from the trellis encoder 1, and supply first and second mapped data in accordance with their respective mapping tables. The first and second mapped data are alternately selected by the selector 53 according to the selection signal, and supplied to the modulator 3.

Figure 5B:
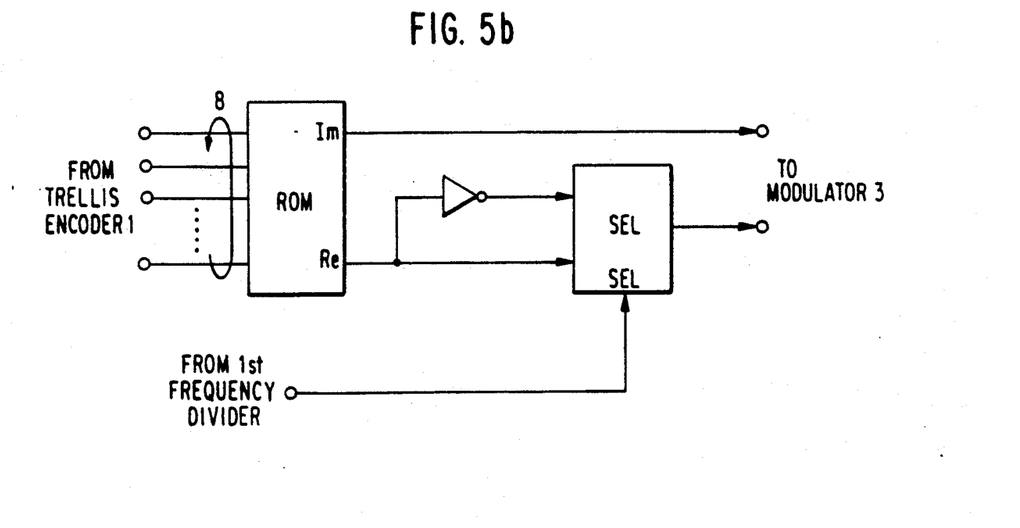

This preferred embodiment of the invention, besides satisfying the conditions I and II, has a symmetric relationship between the two mapping tables. This relationship provides the advantage of simplifying the configuration of the mapping circuit. FIG. 5b illustrates another specific example of the mapping circuit 2 for this embodiment. Since it is possible, as stated above, to realize mapping tables having a symmetric relationship by reversing the polarities of real coordinate outputs, only one ROM would suffice for converting encoded data from the trellis encoder into coordinate data according to a mapping table. In FIG. 5b, a ROM 50 converts encoded data in an eight bit parallel form into coordinate data in such that imaginary axis coordinate values are directly supplied as they are to the modulator 3 while real axis coordinate values are given to the modulator 3 via an inverter 61. The selector 60 to which a selection signal from the first frequency divider 4 is given, alternately selects, and supplies the modulator with, the output of the inverter 61 and the value directly coming from the ROM 50.

As hitherto described, in the frame step-out detecting method according to the invention, the data are mapped in accordance with one or the other of two mapping tables which is switched alternately in a fixed cycle. The two mapping tables which are transparent to a 90°×n phase revolution and neither is transparent to a 90°×n phase revolution of the other. On the receiving side, determination tables respectively matching the mapping tables are switched between each other in the same cycle as on the transmitting side and are used to determine the received data, which are then decoded. It is thereby made possible to detect any frame step-out, even where the data mapping is transparent to a 90°×n phase revolution, according to the presence or absence of continuous decoding error.

What is claimed is:

1. A frame step-out detection method comprising the steps of:
   performing predetermined redundant encoding on input data to produce encoded data;
   alternately selecting, in response to a first selection signal having a predetermined period, first and second mapping tables each of which is transparent to a 90°×n (n is an integer) phase revolution but not transparent to a 90°×n phase revolution of another mapping table;
   converting said encoded data in accordance with said selected mapping table to produce mapped data;
   modulating mapped data to produce modulated data;
   generating a second selection signal corresponding to said first selection signal from said modulated data while demodulating said modulated data to produce a demodulated data stream;
   alternately selecting first and second determination tables corresponding to said first and second mapping tables in response to said second selection signal;
   using said selected determination table to produce determined data from said demodulated data;
   decoding said determined data to produce received data; and
   generating a frame step-out detection signal in the event of any error arising in said decoding,
   said error resulting from a transmission fault which causes a phase lag between the second selection signal and the demodulated data stream.

2. A method as claimed in claim 1, wherein said redundant encoding is trellis encoding and said decoding is Viterbi decoding.

3. A data transmission system comprising:
   encoding means to perform predetermined redundant encoding on input data to supply them as encoded data;
   data mapping means, having first and second mapping tables each of which is transparent to a 90°×n (n is an integer) phase revolution but not transparent to a 90°×n phase revolution of another mapping table, for alternately selecting in a predetermined cycle each of said two mapping tables to convert said encoded data into mapped data;
   modulating means for modulating said mapped data to produce transmitted data;
   demodulating means for accepting said transmitted data and extracting a timing pulse synchronized with said transmitted data while demodulating said transmitted data to produce demodulated data;
   selection signal generating means for generating a selection signal in said predetermined cycle from said timing pulse;
   data determination circuit means, having first and second determination tables corresponding to said first and second mapping tables, for alternately selecting one of the two determination tables in response to said selection signal to produce determined data;
   decoding means for performing decoding corresponding to said determined redundant encoding on said determined data to produce received data; and
   monitor circuit means for monitoring said decoding means to produce a frame step-out detection signal when an error arises in said decoding; said error arising when a transmission fault causes a phase lag between the selection signal and the demodulated data.

4. A data transmission system, as claimed in claim 3, wherein said first and second mapping tables are in a symmetric relationship to each other.

5. A data transmission system, as claimed in claim 3, wherein said encoding means performs trellis encoding and said decoding means performs Viterbi decoding.

* * * * *